Jan. 25, 1955
E. HARVENGT
2,700,471
SIEVE
Filed June 28, 1951
2 Sheets-Sheet 1
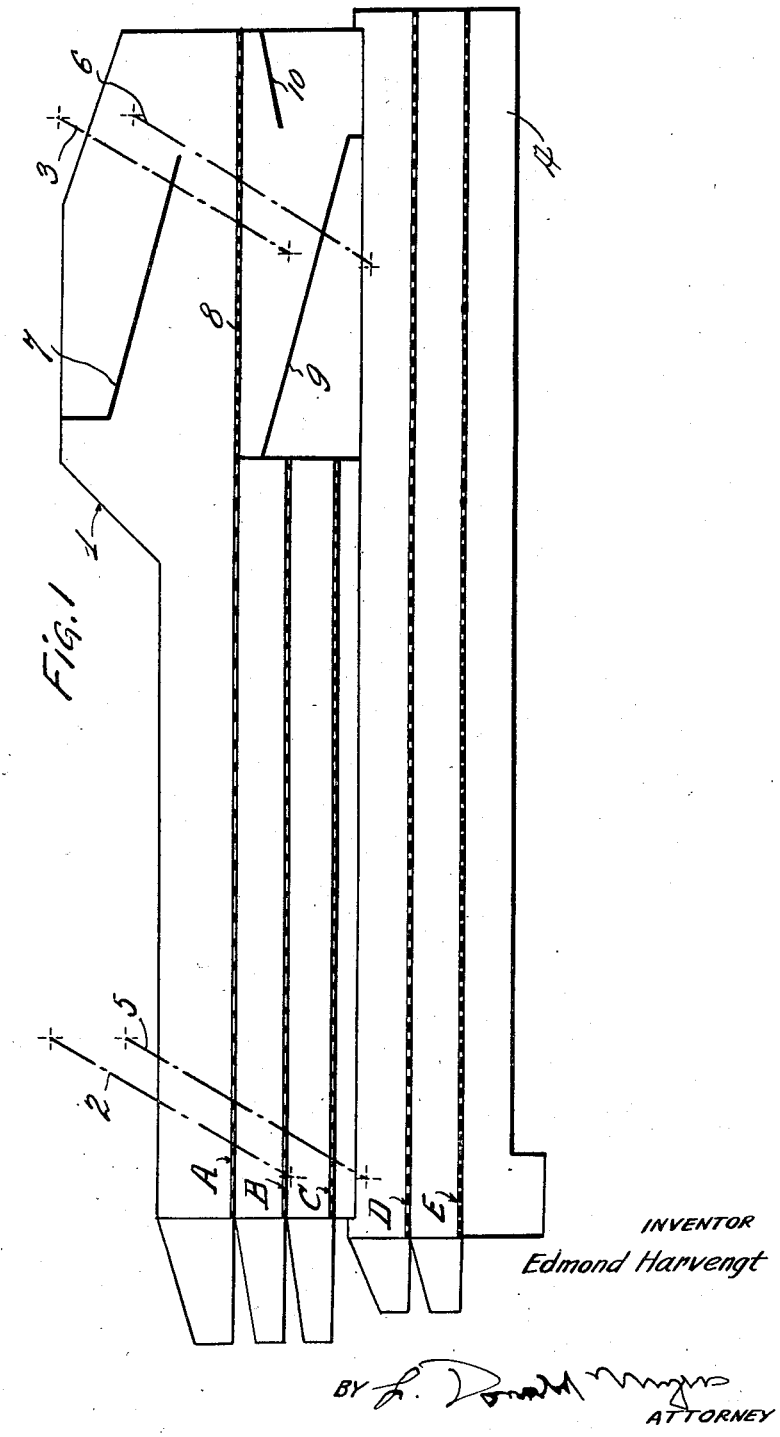
INVENTOR
Edmond Harvengt Jan. 25, 1955
E. HARVENGT
2,700,471
SIEVE
Filed June 28, 1951
2 Sheets-Sheet 2
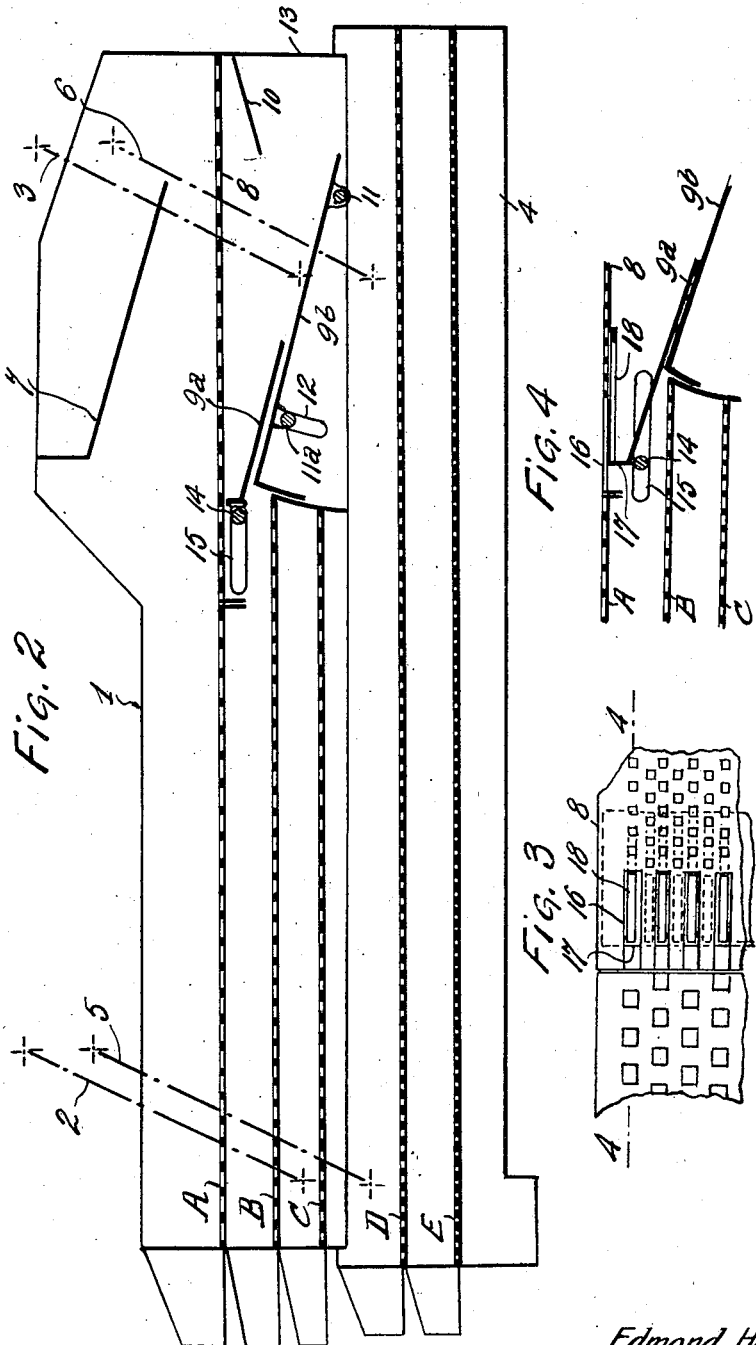
INVENTOR
Edmond Harvengt
BY
ATTORNEY United States Patent Office 2,700,471
Patented Jan. 25, 1955

2,700,471
SIEVE

Edmond Harvengt, Moustier sur Sambre, Belgium, assignor to Link-Belt Company, Chicago, Ill., a corporation of Illinois Application June 28, 1951, Serial No. 234,096

9 Claims. (Cl. 209—315)

The invention relates to sieves, especially, but not exclusively, of the shaking type, and concerns particularly sieves comprising several superimposed screens each of which is intended to furnish a product composed of particles the sizes of which will fall between predetermined limits.

In known arrangements of sieves of this kind, the products to be screened and to be separated into categories are fed onto the uppermost screen. The products of smaller sizes than the mesh of said uppermost screen will pass through the latter and through the proper ones of the several lower screens until each size of product is retained by one of the lower screens with the result that all of the starting material ultimately will be collected as graded products at the end of the said screens.

As a result, each of the successive screens of such an arrangement is not only required to receive and support the load of the products that it will have to retain, but also, temporarily at least, the load or loads of the products to be retained by the lower screen or screens, while its screening action is impeded by the presence of such lower screen products.

In the case of shaking sieves made of two or more superimposed units, the question is of particular importance owing to the overall overload of the upper unit or units and the consequent difficulties for balancing the sieve.

The invention has for its object to avoid, or at least to attenuate these drawbacks.

According to an object of the invention, the sieve comprises several screens, and particularly superimposed screens, which are arranged successively, according to their mesh sizes, in the direction of passage of the material through the sieve. The starting mixture of material is divided, immediately after delivery to the sieve, into two or more parts. The several screens of the sieve, also, are functionally divided into two or more groups. Each part of the divided starting mixture of material is made up of one or several categories of final products and each part is delivered to the group of screens that has the proper mesh size or sizes to effect grading of the category or categories of final products of that part.

According to another object of the invention, at least one of the divided parts of the starting mixture is led to its group of screens along a path, the direction of which is opposite the direction of travel of the material over the surfaces of the sieve screens.

A further object of the invention is to separately support and actuate the different groups of screens and to deliver the divided parts of the starting mixture to the separately supported and actuated groups of screens.

Still another object of the invention is to effect the initial division of the starting mixture of material by a feed screen and to lead the part of the material that passes through such screen to its group of screens by means of mechanism that is adjustable to vary the area of the feed screen that is used in effecting such division of the starting mixture of material.

Other features and advantages of the invention will appear from the following more detailed description of certain preferred embodiments by way of example only.

In the drawings:

Figure 1 is a vertical sectional view of a shaking sieve embodying the invention, Figure 2 is a view similar to Fig. 1 of a modified sieve structure, Figure 3 is a fragmentary plan view of a further modification of the invention, and Figure 4 is a vertical sectional view taken on line 4—4 of Fig. 3.

Referring to the drawings, and first to Fig. 1, the reference character 1 designates generally one unit of a sieve structure comprising a plurality of screens A, B, C. It is to be understood that a larger or smaller number of screens may be used, if desired. It will be assumed that this unit is a part of a shaking sieve, the suspension means of which are diagrammatically indicated at 2 and 3.

The reference 4 designates generally, also, a unit comprising a plurality of screens, two in the example, indicated D and E, it being understood that the number of screens of this unit may be more or less than two.

It is assumed that the unit 4 forms a part of the same shaking sieve as the unit 1, with its suspension means being diagrammatically indicated at 5 and 6.

The mesh sizes of the screens A, B, C, D and E decrease from the screen A to the screen E.

In carrying out the objects of the invention, instead of feeding the entire starting mixture of material to the feed end of a screen A in the usual manner, so that the final categories of products, which are to be graded by certain of the lower positioned screens, will first be required to pass through all of the preceding screens, provision is made for dividing the starting mixture into two parts according to their particle sizes. This procedure makes possible the delivery of one of the parts of material to the feed end of screen A and the other part to the feed end of the desired one of the succeeding screens.

Thus, in the considered sieve, and simply by way of example, but with advantage, the products to be graded by the screens D and E of the unit 4 are directly fed to this unit.

To this end, upon arrival of the starting mixture on the unit 1, there is separated therefrom the products of smaller sizes than the mesh size of the screen C, and the products so separated are fed directly at the head of the screen D of the unit 4, to be screened by the screens of this unit. The load on the screens A, B and C is thus immediately reduced in a corresponding manner, the efficiencies and yields thereof being increased at the same time. Moreover, the load of the unit 1 is appreciably reduced, all other things remaining the same, since the products to be screened by the unit 4 pass more rapidly through this unit 1.

For separating the products to be treated by the unit 4 from the starting mixture that is delivered to the unit 1, one may proceed in various ways but, in accordance with the invention, the starting mixture is fed on to a screen portion that is located at the feed end of the unit 1 and the products that pass through this screen are to be treated by the unit 4 and, for that purpose, are led along a path in a direction that is opposite that of the travel of the products over the surfaces of the screens of the unit.

In this way there is obtained a compensation for a noticeable portion of the momentum of the products travelling on the screens of the unit 1, and the balance of this unit is facilitated.

Fig. 1 shows that the starting mixture of material to be screened is lead by means of an inclined plane 7 on to the end portion of a screen 8 the mesh size of which is the same as that of the screen C, or slightly less. This screen 8 is arranged at the end of the unit 1 and is an extension of the screen A of said unit. The products that pass through the screen portion 8 are collected on an inclined plane 9 and are led by the latter to the end or head of the screen D of the unit 4.

The products retained on the screen portion 8, and which include the products of greater size than the mesh of the screen C of the unit 1, travel towards the other end of this unit and are separated into the corresponding categories by the screens A, B and C. The screen C will pass through it the small quantity of products of smaller sizes, to be treated by the unit 4, which may have been trapped by the large sized particles that will not pass through the screen portion 8 aforesaid.

The products passing through the screen C are collected on the screen D of the unit 4 and are separated into the corresponding categories by the screens of this unit, this together with the products led by the inclined plane 9 to the end of the screen D.

The reference character 10 designates an inclined plane of reduced length intended to avoid too great a fall of the products onto the screen D.

In the example of Fig. 1, the inclined plane 9 is fixed and the ratio of the respective areas of the screen A and the screen portion 8 is invariable so that the point from which the products passing through the screen portion 8 are conducted towards the head of the screen D is fixed.

Experiments have shown that it may be desirable for the operation of the device to be able to modify these various factors, and Figs. 2, 3 and 4 illustrate arrangements that are suitable for fulfilling this condition.

As will be seen in Fig. 2, the inclined plane 9 is formed with two parts 9a and 9b. The part 9b is pivoted at 11 and is provided with a transverse shaft 11a which may slide, and be secured, in a predetermined position within the elongated slots 12 of the box 13 of the unit 1, while the part 9a is movable and slidable on the part 9b and is supported by a transverse shaft 14 which may slide and be secured in a predetermined position within the elongated slots 15 of the box 13.

By means of the described arrangement, the final or end point from which the products passing through the screen portion 8 are conducted towards the end of the screen D may be adjusted as desired. It results that one will be able to adjust the quantity of products which will load the head end of the screen D, thereby improving the operation or yield of the unit 4.

Thus, if an accumulation of products occurs at the head of this screen D while the remainder of its area is slightly loaded only, the shifting to the right of the transverse supporting shaft 14 will result in a reduction of the load at the head of the screen D and an increase of the load of this screen in an intermediate portion of its area, the reverse operation being, of course, effected under reverse conditions.

In the modifications of Figs. 3 and 4, the screen portion 8 is provided with an extension 16 that is at least equal in length to the distance of travel of the end 17 of the inclined plane part 9a. This extension 16 is formed of longitudinally extending, parallel bars which are spaced from each other a distance that is equal to the diameter of the openings in the screen A. The part 9a of the inclined plane, also, is provided with an extension 18 that is formed of longitudinal bars which are spaced a distance that is equal to the diameter of the openings in the screen portion 8. The extension 18 is illustrated as being in contact with the bottom surface of the extension 16 and as being slidable relative thereto. With this arrangement, one may change the relative effective areas of the screen portion 8 and the screen A, thereby improving the operation or effectiveness of the unit 1.

In this way the respective areas of the screen portion 8 and the screen A may be fully utilized, thereby increasing the overall yield of the sieve.

Although certain arrangements only have been described in detail, it is to be understood that the invention is not to be limited to the disclosed arrangements, but is to cover such other modifications and arrangements as may fall within the scope of the subjoined claims.

I claim:

1. In a sieve assembly, a first screening unit comprising a screen box, a series of superimposed screens mounted in one portion of said box and having mesh sizes progressively decreasing downwardly, a feed screen mounted in the remaining portion of said box as an extension of the uppermost screen of the aforesaid series and having a mesh size approximately the same as the lowermost screen of the aforesaid series, means supporting said first screening unit, a second screening unit comprising a screen box, a series of superimposed screens mounted in the second box and having mesh sizes progressively decreasing downwardly relative to each other and to the mesh sizes of the first series of screens, means supporting said second screening unit beneath said first screening unit, an inclined plate positioned in the first box beneath, and with its higher end positioned adjacent, the feed screen and sloping in the direction to feed the material, that passes through said feed screen onto the plate, toward the adjacent end portion of the uppermost screen of the second box, and means supporting the higher end of the inclined plate for sliding adjustments into different positions relative to the length of the feed screen, while maintaining the same relationship between the higher end of the plate and the feed screen, to vary the amount of material passing through the feed screen onto the plate.

2. In a sieve assembly, a first screening unit comprising a screen box, a series of superimposed screens mounted in one portion of said box and having mesh sizes progressively decreasing downwardly, a feed screen mounted in the remaining portion of said box as an extension of the uppermost screen of the aforesaid series and having a mesh size approximately the same as the lowermost screen of the aforesaid series, means supporting said first screening unit, a second screening unit comprising a screen box, a series of superimposed screens mounted in the second box and having mesh sizes progressively decreasing downwardly relative to each other and to the mesh sizes of the first series of screens, means supporting said second screening unit beneath said first screening unit, an inclined plate, formed of two longitudinally adjustable parts to vary the overall length of the plate, positioned in the first box beneath its feed screen and sloping in the direction to feed the material, that passes through said feed screen onto the plate, toward the adjacent end portion of the uppermost screen of the second box, means supporting the lower end of the inclined plate at a fixed position relative to the length of the uppermost screen of the second box, and means supporting the higher end of the inclined plate at different positions relative to the length of the feed screen to vary the amount of material passing through the feed screen onto the plate.

3. In a sieve assembly, a first screening unit comprising a screen box having a feed end portion and a screening portion arranged end-to-end longitudinally of said box, a series of superimposed screens mounted in the screening portion of said box and having mesh sizes progressively decreasing downwardly, a screen mounted in the feed end portion of said box as an extension of the uppermost screen of the aforesaid series and having a mesh size approximately the same as the lowermost screen of the aforesaid series, means supporting said first screening unit for shaking movements, a second screening unit comprising a screen box having a screening portion at least equal in length to the combined lengths of the feed end and screening portions of the first box, a series of superimposed screens mounted in the screening portion of the second box and having mesh sizes progressively decreasing downwardly relative to each other and to the mesh sizes of the first series of screens, means supporting said second screening unit for shaking movements relative to and beneath said first screening unit, an inclined plate positioned in the feed end portion of the first box beneath, and with its higher end portion adjacent, the screen located therein and sloping in the direction to feed the material, that passes through said screen onto the plate, toward the adjacent end portion of the uppermost screen of the second box, and means supporting the higher end of the inclined plate for sliding adjustments into different positions relative to the length of the screen located in the feed end portion of the first box, while maintaining the same relationship between the higher end of the plate and the screen, to vary the amount of material passing through said screen onto the plate.

4. In a sieve assembly, a first screening unit comprising a screen box having a feed end portion and a screening portion arranged end-to-end longitudinally of said box, a series of superimposed screens mounted in the screening portion of said box and having mesh sizes progressively decreasing downwardly, a screen mounted in the feed end portion of said box as an extension of the uppermost screen of the aforesaid series and having a mesh size approximately the same as the lowermost screen of the aforesaid series, means supporting said first screening unit for shaking movements, a second screening unit comprising a screen box having a screening portion at least equal in length to the combined lengths of the feed end and screening portions of the first box, a series of superimposed screens mounted in the screening portion of the second box and having mesh sizes progressively decreasing downwardly relative to each other and to the mesh sizes of the first series of screens, means supporting said second screening unit for shaking movements relative to and beneath said first screening unit, and an inclined plate, formed of two longitudinally adjustable parts to vary the overall length of the plate, positioned in the feed end portion of the first box beneath the screen located therein and sloping in the direction to feed the material, that passes through said screen onto the plate, toward the adjacent end portion of the uppermost screen of the second box, means supporting the lower end of the inclined plate at a fixed position relative to the length of the uppermost screen of the second box, and means supporting the higher end of the inclined plate at different positions relative to the length of the screen located in the feed end portion of the first box to vary the amount of material passing through said screen onto the plate.

5. In a sieve assembly, a series of superimposed screens having mesh sizes progressively decreasing downwardly, a feed screen positioned as an extension of the uppermost screen of the series and having a mesh size approximately the same as one of the intermediate screens of the series, the screens of the series located below the said one intermediate screen having portions of their lengths extending beneath the feed screen, and an inclined plate adjustable in length positioned between variable portions of the feed screen and the said extending portions of the lower screens and sloping in the direction to feed the material, that passes through the portion of the feed screen overlying the plate, toward the extending portion of the uppermost one of the lower screens while permitting the material passing through the remainder of the feed screen to fall onto the next to the uppermost screen of the series.

6. In a sieve assembly, a series of superimposed screens having mesh sizes progressively decreasing downwardly, a feed screen positioned as an extension of the uppermost screen of the series and having a mesh size approximately the same as one of the intermediate screens of the series, the screens of the series located below the said one intermediate screen having portions of their lengths extending beneath the feed screen, an inclined plate positioned between the feed screen and the said extending portions of the lower screens, with its higher end adjacent the feed screen, and sloping in the direction to feed all of the material, that passes through the feed screen onto the plate, toward the extending portion of the uppermost one of the lower screens, and means supporting the higher end of the inclined plate for sliding adjustments into different positions relative to the length of the feed screen, while maintaining the same relationship between the higher end of the plate and the feed screen, to vary the amount of material passing through the feed screen onto the plate.

7. In a sieve assembly, a series of superimposed screens having mesh sizes progressively decreasing downwardly, a feed screen positioned as an extension of the uppermost screen of the series and having a mesh size approximately the same as one of the intermediate screens of the series, the screens of the series located below the said one intermediate screen having portions of their lengths extending beneath the feed screen, an inclined plate adjustable in length positioned between the feed screen and the said extending portions of the lower screens and sloping in the direction to feed the material, that passes through the feed screen onto the plate, toward the extending portion of the uppermost one of the lower screens, and means supporting the higher end of the inclined adjustable plate at different positions relative to the length of the feed screen to cause the material passing through the portion of the feed screen located beyond the position of the higher end of the inclined plate to fall onto the next to the uppermost screen of the series.

8. In a sieve assembly, a series of superimposed screens having mesh sizes progressively decreasing downwardly, a feed screen positioned as an extension of the uppermost screen of the series and having a mesh size approximately the same as one of the intermediate screens of the series, the screens of the series located below the said one intermediate screen having portions of their lengths extending beneath the feed screen, an inclined plate, formed of two longitudinally adjustable parts to vary the overall length of the plate, positioned between the feed screen and the said extending portions of the lower screens and sloping in the direction to feed the material, that passes through the feed screen onto the plate, toward the extending portion of the uppermost one of the lower screens, means supporting the lower end of the inclined plate at a fixed position relative to the length of the uppermost one of the lower screens, and means supporting the higher end of the inclined plate at different positions relative to the length of the feed screen to vary te amount of material passing through the feed screen onto the plate.

9. In a sieve assembly, a series of superimposed screen plates having aperture sizes progressively decreasing downwardly, a feed screen plate positioned as an extension of the uppermost screen plate of the series and having the greater portion of its length provided with apertures of a size approximately the same as one of the intermediate screens of the series and having the remainder of its length, which is next adjacent said uppermost screen, provided with longitudinal slots having a width equal to the aperture size of the uppermost screen of the series, an auxiliary screen plate slidably adjustable relative to the slotted portion of the feed screen plate and provided with registering slots having a width equal to the aperture size of the feed screen plate, the screens of the series located below the said one intermediate screen having portions of their lengths extending beneath the feed screen, and an inclined plate adjustable in length positioned between the feed screen and the said extending portions of the lower screens, said inclined plate having its higher end attached to the inner end of the auxiliary its higher end attached to the inner end of the auxilary screen plate and sloping in the direction to feed the material, that passes through the feed screen and the auxiliary screen plate onto the inclined plate, toward the extending portion of the uppermost one of the lower screens.

References Cited in the file of this patent

UNITED STATES PATENTS

| | | |
|---|---|---|
| 526,623 | Hatfield | Sept. 25, 1894 |
| 852,050 | Barbeau | Apr. 30, 1907 |
| 2,164,796 | Bird | July 4, 1939 |

FOREIGN PATENTS

| | | |
|---|---|---|
| 33,870 | Holland | Oct. 15, 1934 |
| 48,194 | Holland | Apr. 15, 1940 |
| 211,002 | Great Britain | Feb. 14, 1924 |